Figure 3:
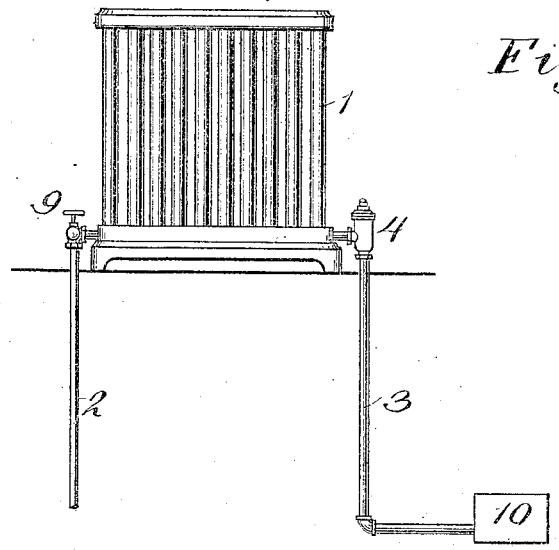

No. 890,239. PATENTED JUNE 9, 1908.
J. H. KINEALY.
VALVE DEVICE FOR HEATING SYSTEMS.
APPLICATION FILED APR. 10, 1903.
4 SHEETS—SHEET 1.
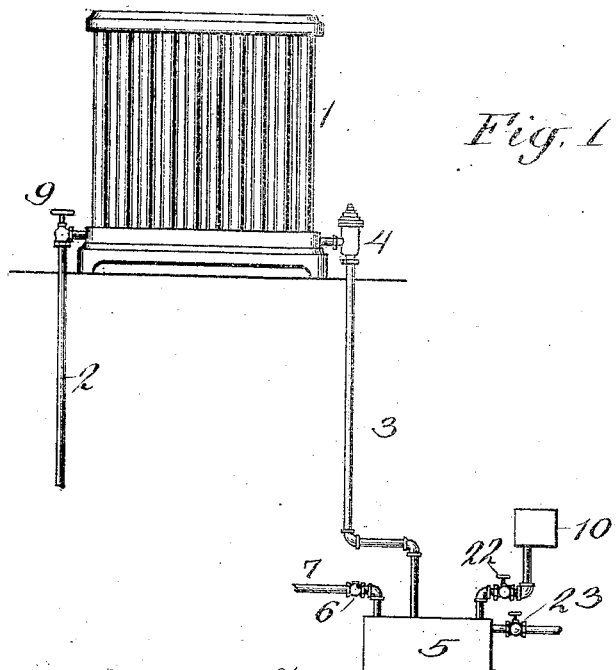
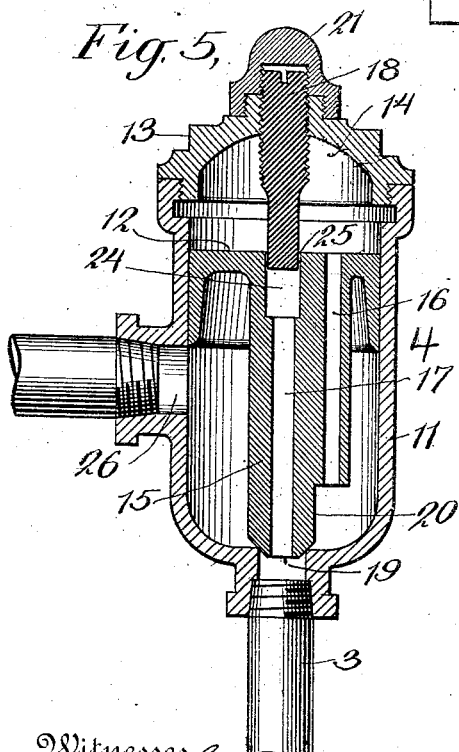
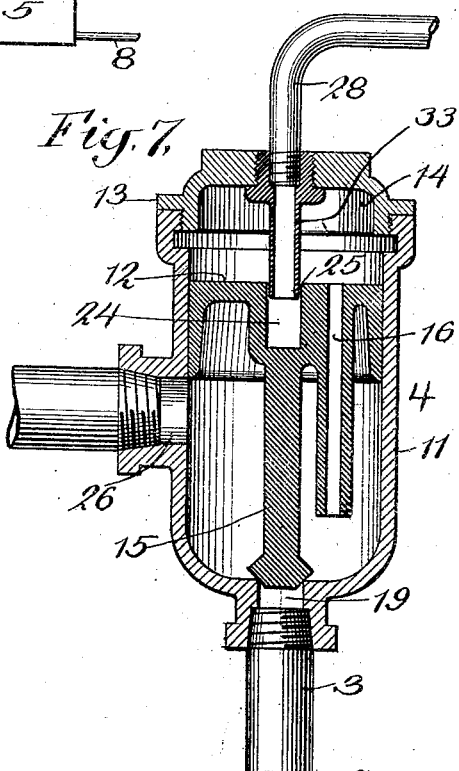

No. 890,239. PATENTED JUNE 9, 1908.
J. H. KINEALY.
VALVE DEVICE FOR HEATING SYSTEMS.
APPLICATION FILED APR. 10, 1903.
4 SHEETS—SHEET 2.
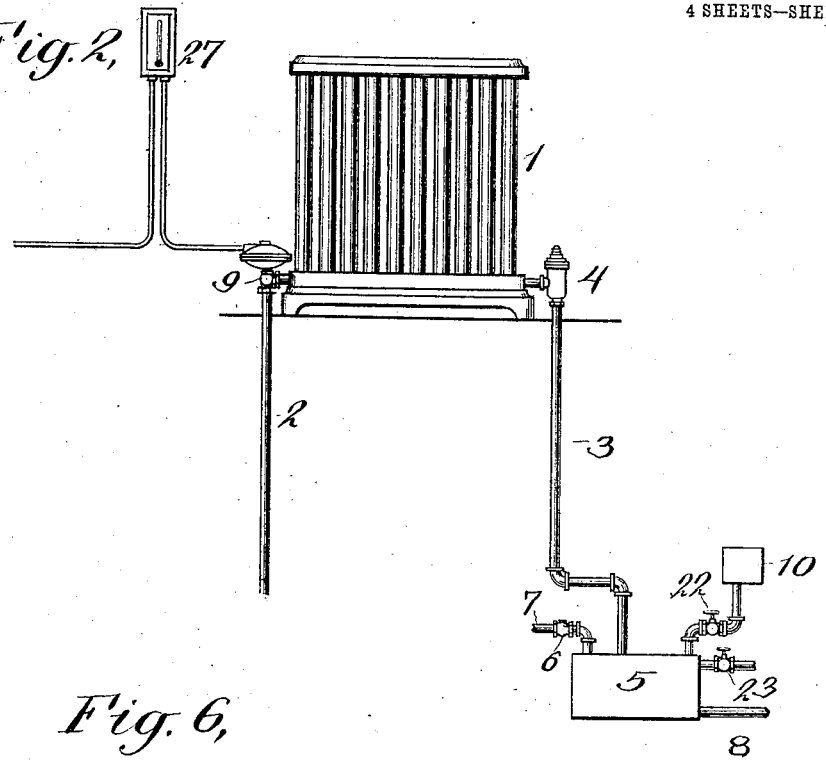
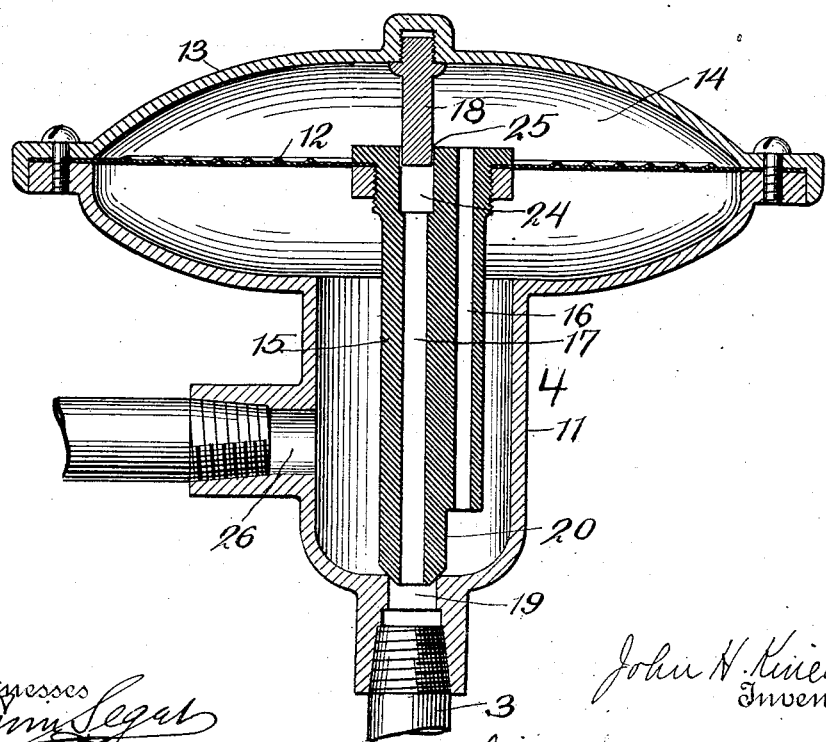

No. 890,239. PATENTED JUNE 9, 1908.
J. H. KINEALY.
VALVE DEVICE FOR HEATING SYSTEMS.
APPLICATION FILED APR. 10, 1903.

4 SHEETS—SHEET 3

Witnesses

John H. Kinealy,
Inventor,
By his Attorneys
Kenyon & Kenyon.

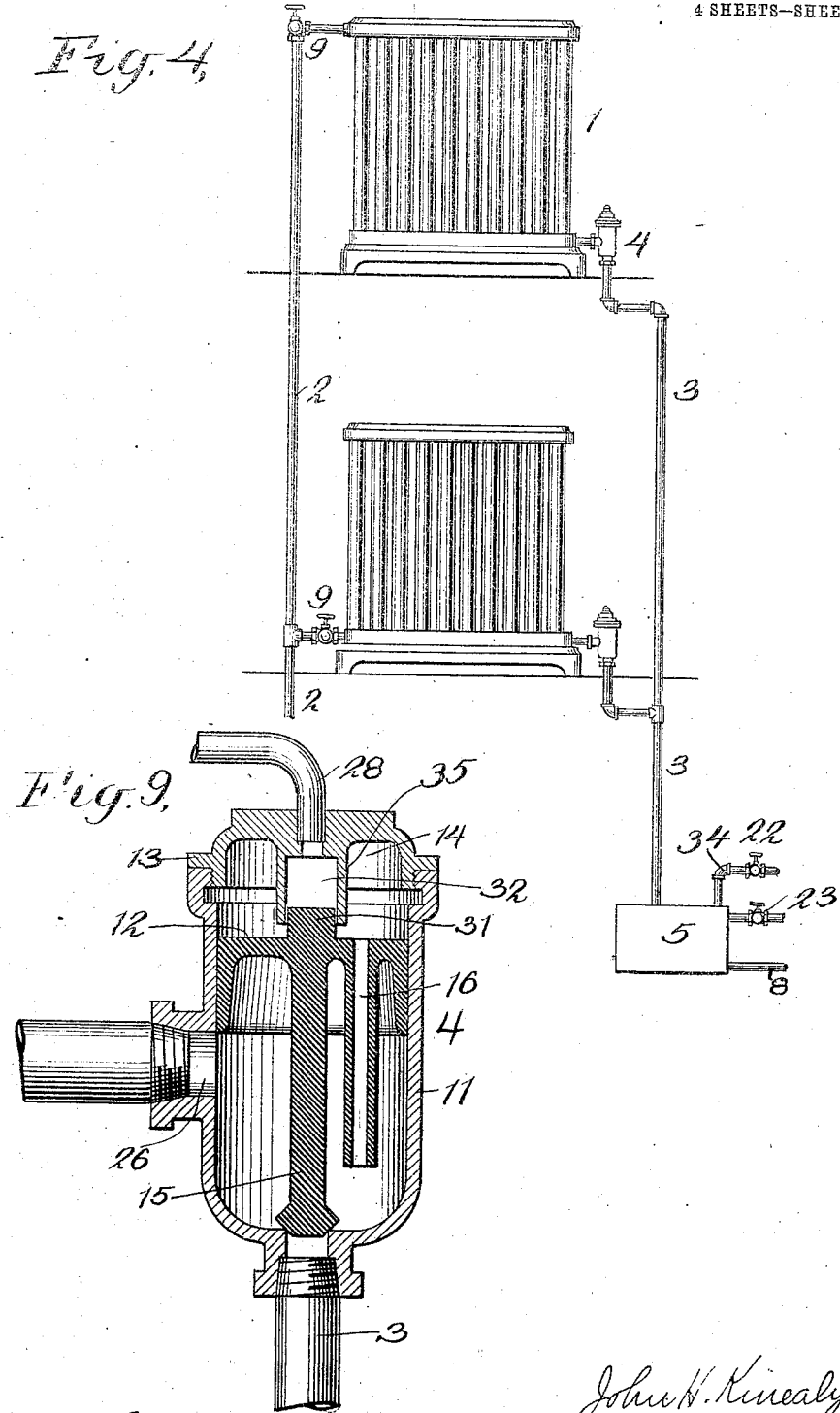

UNITED STATES PATENT OFFICE.

JOHN H. KINEALY, OF BOSTON, MASSACHUSETTS, ASSIGNOR, BY MESNE ASSIGNMENTS, TO ANDREW G. PAUL, OF BOSTON, MASSACHUSETTS.

VALVE DEVICE FOR HEATING SYSTEMS.

No. 890,239.                Specification of Letters Patent.        Patented June 9, 1908.

Application filed April 10, 1903.   Serial No. 152,008.

*To all whom it may concern:*

Be it known that I, JOHN H. KINEALY, a citizen of the United States, residing in Boston, in the county of Suffolk and State of Massachusetts, have invented a new and useful Improvement in Valve Devices for Heating Systems, of which the following is a full, clear, and exact specification, reference being had to the accompanying drawings, which form a part hereof.

My invention relates to attachments for heating systems in which steam is used as the heating medium.

It relates to that form or type of system in which the water of condensation and the air are removed through the return or discharge pipe, as distinguished from that type of system in which the air is removed through a separate air pipe.

The object of my invention is to prevent the passage of a substantial or material amount of steam from the heater or the radiator into the discharge pipe, while allowing air and water to be discharged from the heater or radiator, thus enabling the heating to be done more economically, and allowing the use of smaller pipes for supplying the steam to the heaters or radiators, and for discharging the air and water therefrom, and making it easier to maintain a high vacuum in the discharge pipe because of the absence of any material amount of steam in said pipe.

Another object of my invention is to enable steam to be used or maintained at different pressures in the different heaters or radiators, the steam being supplied to the said heaters or radiators from the same main steam supply pipe.

Another object of my invention is to provide a simple and serviceable automatic valve for use on the return pipe of the heating system which can be readily applied to any ordinary steam heating system now in use and which will operate efficiently to permit of the discharge of air and water while preventing the loss of any substantial amount of steam.

Another object of my invention is to enable the valve to be readily opened so that it can be cleaned or freed from any obstruction.

Another object of my invention is to provide a valve which can be easily and economically manufactured, which will be certain and reliable in its operation, and which will not be liable to get out of order.

My invention consists first in a valve device for use in a heating system comprising a valve casing of any suitable form or description, a discharge port through which the water is discharged, a valve or valve piece controlling the said port, a fluid pressure motor, such as a piston or a diaphragm, controlling the valve piece, the casing being provided with a fluid pressure chamber on one side of the motor, an equalizing passage connecting the fluid pressure chamber and the inlet side of the valve of such form or size that it will permit air and steam to flow through it and a small quantity of water when the lower end of the passage has been sealed or closed by the accumulation of a body of water in the casing, a second passage connecting the fluid pressure chamber with an escape pipe, the second passage being so constructed as to offer greater resistance to the flow than the equalizing passage, whereby when the equalizing passage is sealed by an accumulation of water a small quantity of water will pass through it into the fluid pressure chamber, but the flow of this water through the equalizing passage will be so retarded that the pressure in the fluid pressure chamber will become less than the pressure on the inlet side of the motor, as a result of which the motor will be moved and the valve opened, so as to discharge the water, and whereby when the water has been discharged the valve will close. In the best form of the invention the second passage is so arranged as to be connected with the lower part of the fluid pressure chamber, either during the entire time or when the motor is in a raised position, and this passage is adapted to be restricted in capacity when the motor is raised.

My invention also consists in making the equalizing passage pass through the body of the motor itself and extend down a sufficient distance so that its lower end will be sealed when a sufficient amount of water accumulates in the valve to make it advisable to cause the discharge of the same.

My invention also consists in causing the second passage to extend through the motor so as to connect the fluid pressure chamber with the discharge pipe.

My invention also consists in providing the casing with a projection so arranged as to form the second passage connecting the fluid pressure chamber with the escape pipe, which passage operates as already explained. In the best form of my invention this projection is a plug so arranged that it projects into the second passage and tends to restrict the same in size and to retard the flow therethrough. The plug is made adjustable so that it can be caused to project more or less into this second passage and so that it can be moved out sufficiently to cause the valve to open fully for the purpose of cleaning or for any other purpose.

My invention also consists in providing a secondary chamber into which the second passage leads and in connecting the second chamber with an escape pipe. In the best form of my invention the secondary chamber is in the motor and the plug projects into it so as to form a passage between the fluid pressure chamber and this secondary chamber, this passage being smaller in area than the equalizing passage. In the best form of my invention also the secondary chamber is connected with the discharge pipe by means of a passage extending through the motor and the valve piece.

My invention also consists in certain other features of construction and combinations of parts hereinafter described and claimed.

My invention is fully shown in the accompanying drawings, in which

Figure 1 shows a steam heating system in which an ordinary hand valve is used in the supply pipe, and the discharge pipe of which is provided with my improved automatic valve device, and is connected to a receiver or trap, and an exhauster is also connected to the receiver or trap; Fig. 2 shows a similar steam heating system having the additional feature of a valve on the supply pipe controlled by a thermostat; Fig. 3 shows a steam heating system in which no receiver is used, but the exhauster is connected directly with the end of the discharge pipe; Fig. 4 shows a system having two heaters or radiators, each provided with an ordinary valve in the supply pipe and the automatic valve device in the discharge pipe, the main discharge pipe being connected to a receiver which is open to the atmosphere; Fig. 5 is a vertical cross-sectional view of one form or embodiment of my improved valve device; Figs. 6, 7, 8, and 9 show other forms or modifications of my improved valve device.

Similar numbers indicate similar parts in the different figures.

Referring to Fig. 1, 1 is a heater or radiator; 2 is a supply pipe; 3 is a discharge pipe; 4 is my improved valve device which is placed on the discharge pipe; 5 is a receiver or trap into which the water and the air pass which escape from the heater or radiator through the valve device; 7 is a pipe connecting the receiver with the atmosphere, and 6 is a suitable valve on the said pipe; 8 is a pipe through which the water may be discharged or drawn off from the receiver or trap and caused to flow to the boiler or elsewhere, as may be desired.

9 is an ordinary hand valve on the supply pipe; 10 is an exhauster or exhausting device of any suitable form, such as a pump or a fan or an ejector.

The exhausting device is connected with the receiver or trap 5 by means of a pipe which is provided with any suitable form of valve 22; 23 is a pipe by which cold water may be introduced into the receiver or trap to condense any vapor therein when it is desirable; this pipe is provided with any suitable form of valve. The valve 6 on the pipe 7 is preferably a check valve that will open outward, but will not open inward, and that will thus prevent the pressure in the receiver or trap from exceeding that of the atmosphere while allowing it to be less than the atmosphere.

One form of my improved construction of the automatic valve device 4 is clearly shown in Fig. 5. Referring to this figure, 11 is a valve casing; 12 is a fluid pressure motor connected with and operating a valve piece 20, which controls an outlet or discharge port 19. The upper part of the casing is fitted with a cap 13 which is fastened to the casing by suitable screw-threads, as shown, or in any other way. This forms, in the upper part of the casing, a fluid pressure chamber 14 above the fluid pressure motor. The form of fluid pressure motor used in this valve is a piston which is fitted to the casing so as to move up and down readily in the casing, but not to permit any substantial amount of air or steam to escape past the piston between the piston and the wall of the casing. The piston is provided with a projecting portion 15 extending downwardly and carrying at its lower end the valve piece 20.

16 is an equalizing passage extending through the motor and through the downwardly projecting portion 15 so that the lower end of this equalizing passage is adapted to be closed or sealed by an accumulation of the water of condensation in the casing. This equalizing passage connects the fluid pressure chamber 14 with the inlet side of the valve, and is made of such a size as to permit air and steam to flow through it from the inlet side to the fluid pressure chamber, and also to permit some water to flow through it after its lower end has been sealed, as already explained. 17 is another passage through the downwardly projecting portion of the fluid pressure motor, which operates as an escape pipe to permit the escape of air and water from the fluid pressure chamber 14 to the discharge pipe 3. 18 is a plug supported by the casing. In the form shown the plug is provided with a screw-thread which takes into a screw-thread in the cap 13. In this way the plug is made adjustable so that it can be moved up or down relatively to the cap 13.

21 is a small cover or cap which is screwed or otherwise suitably fastened to the cap 13, and serves to protect the plug 18 and prevent its being interfered with after it has been once adjusted. The upper end of the passage 17 is enlarged so as to form a secondary chamber 24 in the motor. The lower end of the plug 18 in its normal position projects downwardly into the secondary chamber 24, and is thus arranged so as to form a passage 25 connecting the fluid pressure chamber with the secondary chamber 24. The passage 25 is smaller than the equalizing passage 16, and is of such a size as to offer greater resistance to the flow than the equalizing passage. It will be seen that in this construction the passage 17 is an escape pipe with which the passage 25 connects the fluid pressure chamber through the secondary chamber 24. When the piston 12 rises, the passage 25 between the piston and the plug is increased in length, and is thereby restricted in capacity when the motor is raised. It will be seen, also, that the passage 25 is so arranged as to be connected with the lower part of the fluid pressure chamber 14 when the motor is in its raised position as well as when the motor is in its lowest position. 26 is the inlet port of the valve.

In the best form of the valve device, the fluid pressure motor is made to work easily and with a slight difference of pressures on its upper and lower sides; the equalizing passage 16 is fairly large so as to permit the easy flow of air and steam and of some portion of the water from the inlet side of the valve casing into the fluid pressure chamber 14; the passage 25 must be large enough to permit the passage of water from the fluid pressure chamber 14 to the secondary chamber 24, but to somewhat retard the flow of the water between these two points.

The operation of the valve device is as follows: When the pressure in the heater or radiator is greater than that which exists in the discharge pipe, any air which may be in the heater or radiator is forced out and into the valve casing through the inlet port 26; then it passes through the equalizing passage 16 into the fluid pressure chamber 14, and from there through the passage 25 into the secondary chamber 24, and from there through the passage 17 into the discharge pipe. When steam enters the heater or radiator and is condensed, the water of condensation flows into the valve casing through the inlet port 26, and gradually accumulates therein until it fills the bottom part of the casing and seals or closes the lower end of the equalizing passage 16. As a result of this, the pressure in the fluid pressure chamber 14 will become less than the pressure in the upper part of the valve casing below the fluid pressure motor, and the pressure in the secondary chamber 24 will also be less than the pressure underneath the fluid pressure motor. The fluid pressure motor will, therefore, rise, lifting the valve piece 20, and will thus open the outlet port 19 and allow the water to pass from the lower portion of the valve casing into the discharge pipe. Some water will pass up through the equalizing passage 16 into the fluid pressure chamber 14, and will collect on top of the fluid pressure motor. When the motor rises, the lower end of the equalizing passage 16 will be opened or unsealed, and as a result of this, the pressure in the fluid pressure chamber 14 will become equal to that which exists in the valve casing underneath the motor. At this time the water which has passed through the equalizing passage 16 into the fluid pressure chamber 14 is flowing through the passage 25. The size of the passage 25 is such that the escape of this water through the same is retarded. As a result of this operation, the fall of the fluid pressure motor and the closing of the outlet port 19 are retarded. When all, or a portion of the water which flowed through the passage 16 into the fluid pressure chamber 14 has escaped through the passage 25, the valve closes.

In actual operation with the valve properly adjusted when the sizes of the fluid pressure motor 12, the equalizing passage 16, the passage 25 and the secondary chamber 24 are properly proportioned, the fluid pressure motor will not operate to open the outlet port 19, when only air or steam without water comes to the valve device, but when water comes to the valve device the fluid pressure motor operates, as described, to allow the water to pass into the discharge pipe without allowing any material amount of steam to pass with it. The amount which the valve device 20 is lifted, and the extent to which the outlet port is thereby opened, are automatically regulated with reference to the amount of water coming to the valve device. The influence of the secondary chamber upon the operation of the fluid pressure motor depends upon its size and upon the weight of the fluid pressure motor and the parts attached to it. If the secondary chamber be made so small as to be simply a continuation of the passage 17, then its influence upon the operation of the motor is apt to be small, and the benefit of the construction may be entirely due to the passage 25, the effect of which is automatically controlled by the condition of the fluid passing through it. By adjusting the plug 18, that is, by moving it up or down relatively to the normal position of the motor 12, the area or capacity of the passage 25 can be varied.

The further down the plug is moved, the longer the passage will become, and the greater will be the retarding effect which it produces upon the flow of water through the same. The plug is adjusted at the start to meet the conditions of the system, and its position need not be altered thereafter during the operation of the device. If it becomes desirable to open the valve wide in order to clean the same, this can be done by unscrewing the cap 21 and unscrewing the plug sufficiently to lift it entirely out of the passage through the motor.

My improved valve device can be used in pressure systems where atmospheric pressure or a higher pressure is maintained in the discharge pipe, and a pressure greater than atmosphere is carried in the system, but the advantages of my invention will be more completely realized where an exhauster is employed.

In the system represented in Fig. 1, the discharge pipe discharges into a receiver or trap 5. The exhauster 10 is connected with the receiver, and operates to produce a vacuum in the receiver 5 and in the discharge pipe 3. By employing the exhauster and producing a vacuum in the discharge pipe, the radiators or heaters can be run at any pressure desired below or above atmosphere, and different radiators can be run at different pressures. In the system shown in Fig. 1, the air is withdrawn from the system through the receiver or trap 5 and exhauster 10, and the water is withdrawn or discharged through the pipe 8 by any suitable means.

Referring to Fig. 2, the parts are the same as already described in connection with Fig. 1, except that the supply valve 9 is operated by a thermostat 27 placed on the wall of the room or in any other suitable location. Any suitable or well known arrangement of the thermostat and supply valve may be used for this purpose. In the drawing I have represented a supply valve controlled by a diaphragm, and a pipe running from this diaphragm to the thermostat 27 and continuing from the thermostat to an exhauster or to a source of fluid under pressure. The exhauster or source of fluid under pressure is not shown in the drawing. The thermostat can be made to open and close the pipe by any well known means, operating when it closes the pipe to at the same time open a vent to the chamber above the diaphragm. I have not shown the details of construction in this figure as they are well known in this art, and separately considered form no part of my invention. Moreover, this part of my invention is not limited to any particular construction or arrangement of supply valve and thermostat.

In Fig. 3 I have shown a system the same as that shown in Fig. 1, except that the discharge pipe 3 is connected directly with the exhauster 10 without the use of any receiver. In this construction, the water and air are removed by the exhauster and pass through the exhausting device.

In Fig. 4 I have shown a system having two or more radiators, each radiator being provided with one of my improved automatic valve devices 4, as shown. The upper radiator in this figure is provided with a supply pipe attached to the top of the radiator, whereas the lower radiator has a supply connection leading to the bottom of the radiator. In this system, no exhauster is used, as the system is intended to be operated under pressure. The air and water pass into the receiver or trap 5, from which the air escapes through the pipe 34, and the water is discharged through the pipe 8.

In Fig. 6 I have shown a modification of my automatic valve device. In this form of my improved valve, the motor 12 is made in the form of a diaphragm, which is supported in any suitable manner at its edge between the casing 11 and the cap 13. The diaphragm is attached in any suitable way at the center thereof to the downwardly projecting part 15, which carries at its lower end the valve piece 20. This valve operates in substantially the same manner as the valve shown in Fig. 5.

In Fig. 7 I have shown another modification of my improved valve device, differing from the valve shown in Figs. 5 and 6 in the respect that there is no passage 17 through the downwardly projecting part of the motor. In place of this passage there is an escape pipe 28 connected with the top of the plug 33, and there is a passage through the plug connecting the escape pipe with the secondary chamber 24. In this construction I prefer to connect the escape pipe 28 with an exhauster. This valve operates in substantially the same manner as already explained, except that the air and water which pass into the chamber 24 instead of escaping downwardly into the discharge pipe 3, escape through, or are drawn through the escape pipe 28.

Figure 8:
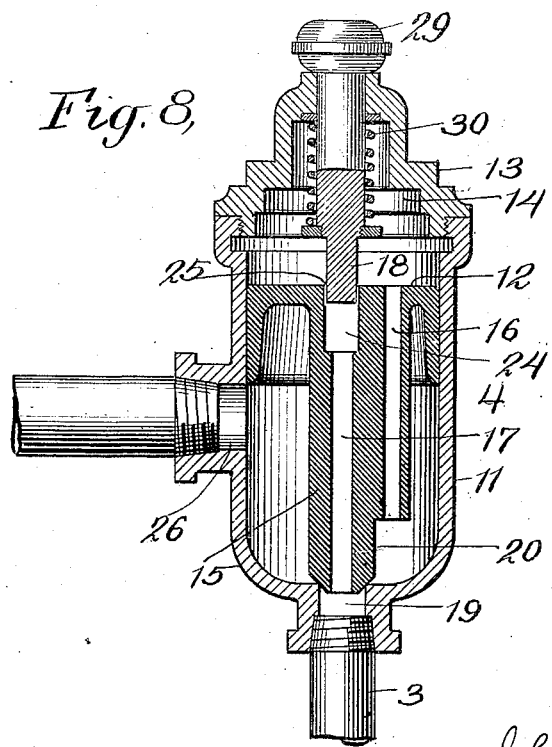

In Fig. 8 I have shown another modification of my improved valve device differing from the valve shown in Fig. 5 only in respect to the particular construction and arrangement of the plug 18. In this modification the plug 18 extends through a bearing in the cap 13 and is movable up and down in that bearing by means of the thumb-piece 29. The plug is surrounded by a coiled spring 30 bearing at its upper end against the cap 13 and bearing at its lower end against a collar on the plug 18. The spring 30 operates to hold the plug down in its normal position, but when it is desired to open the valve in order to clean it or for any other purpose, the plug 18 can be raised by means of the thumb-piece 29, and when this is done the valve will open. The plug 18 is therefore a movable plug. In other respects the valve device is constructed and operates the same as the valve device illustrated in Fig. 5.

In Fig. 9 I have shown another modification of my improved valve device. In this form of my invention the cap 13 of the casing is provided with a hollow plug or projection 35 extending downwardly as shown. The motor is provided with an upwardly extending projection 31 between which and the projection 35 a second passage is formed as shown.

32 is a secondary chamber which in this case is in the plug or projection 35 and this chamber is connected with an escape pipe 28 passing through the top of the casing. This form of valve operates in substantially the same manner as the form of valve shown in Fig. 7.

It will be obvious that some of the details of my invention may be changed in construction, and that the parts may be somewhat differently arranged from what is shown in the drawings.

Some of the advantages of my invention are as follows. The air is removed quickly and certainly whenever it enters or collects in the radiator. The water is removed quickly and certainly whenever it accumulates in any substantial quantity in the casing of the valve. No substantial amount of steam is lost or wasted through the discharge pipe. The valve works automatically, according to the requirements of the particular radiator to which it is attached. The valve is simple and durable in construction, and is not likely to get out of order or to need repairing. The valve is practically noiseless in its operation. The valve is economical to manufacture, and is certain in its operation.

In my improved system, the different radiators can be operated successfully at very low pressures, thereby producing great economy in the consumption of steam. The operation of the separate radiators can also be separately controlled so as to vary the pressure in the different radiators according to the requirements of the system.

My improvements can be very easy and economically applied to old systems that have previously operated under pressure.

What I claim as new and desire to secure by Letters Patent, is:

1. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a second passage connecting the fluid pressure chamber with an escape pipe, and adapted to be restricted in capacity when the motor is raised.

2. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a second passage connecting the fluid pressure chamber with an escape pipe, and so arranged as to be connected with the lower part of the fluid pressure chamber and restricted in capacity, when the motor is raised, substantially as set forth.

3. A valve device comprising a valve casing, a discharge port for the water, a valve piece controlling the port, a fluid pressure motor controlling the valve piece, the casing being provided with a fluid pressure chamber on one side of the motor, an equalizing passage through the motor connecting the fluid pressure chamber and the inlet side of the valve and adapted to be sealed by an accumulation of liquid in the casing, a second passage through the motor connecting the fluid pressure chamber with the discharge pipe, the second passage being smaller than the equalizing passage and of such a size as to permit the escape of air but to retard the escape of water, and being adapted to be restricted in capacity when the motor is raised, substantially as set forth.

4. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of the air and steam and some water, a projection supported by the casing, a second passage between the projection and the motor connecting the fluid pressure chamber with an escape pipe, and said projection adapted to restrict said passage when the motor rises, substantially as set forth.

5. A valve device comprising a valve casing, a discharge port for the water, a valve piece controlling the port, a fluid pressure motor controlling the valve pieces, the casing being provided with a fluid pressure chamber on one side of the motor, an equalizing passage connecting the fluid pressure chamber and the inlet side of the valve adapted to permit the flow through it of air and steam and some water, a second passage through the motor connecting the fluid pressure chamber with an escape pipe, and a plug supported by the casing and projecting into the second passage, substantially as set forth.

6. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a second passage in the motor connecting the fluid pressure chamber with an escape pipe, and a movable plug supported by the casing and projecting into the second passage, substantially as set forth.

7. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a second passage through the motor connecting the fluid pressure chamber with an escape pipe, and an adjustable plug supported by the casing and projecting into the second passage, substantially as set forth.

8. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a secondary chamber, a projection supported by the casing and so arranged as to form a passage between the fluid pressure chamber and the secondary chamber smaller than the equalizing passage, and an escape pipe connected with the secondary chamber, substantially as set forth.

9. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a secondary chamber in the motor, a plug supported by the casing and projecting into the secondary chamber and so arranged as to form a passage between the fluid pressure chamber and the secondary chamber smaller than the equalizing passage, and an escape pipe connected with the secondary chamber, substantially as set forth.

10. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a secondary chamber in the motor, an adjustable plug supported by the casing and projecting into the secondary chamber and so arranged as to form a passage between the fluid pressure chamber and the secondary chamber smaller than the equalizing passage, and an escape pipe connected with the secondary chamber, substantially as set forth.

11. A valve device comprising a valve casing, a discharge port for the water, a valve piece controlling the port, a fluid pressure motor controlling the valve piece, the casing being provided with a fluid pressure chamber on one side of the motor, an equalizing passage connecting the fluid pressure chamber and the inlet side of the valve adapted to permit the flow through it of air and steam and some water, a secondary chamber in the motor, a plug supported by the casing and projecting into the secondary chamber and so arranged as to form a passage between the fluid pressure chamber and the secondary chamber smaller than the equalizing passage, and a passage through the motor connecting the secondary chamber with the discharge pipe, substantially as set forth.

12. A valve device comprising the valve casing 11, the inlet port 26, the outlet port 19, the valve piece 20, the fluid pressure motor 12, the fluid pressure chamber 14, the secondary chamber 24, the plug 18, the equalizing passage 16, the passage 25, and the passage 17, substantially as described.

In testimony whereof, I have signed my name to this specification, in the presence of two subscribing witnesses.

JOHN H. KINEALY.

Witnesses:
ELLA G. BIRTWELL,
BERTRAND K. RICHARDSON.